Jan. 14, 1969    J. S. PATERSON    3,421,784
DEGAUSSING CIRCUIT FOR ELECTRO-MAGNETIC CLUTCH
Filed Dec. 28, 1966
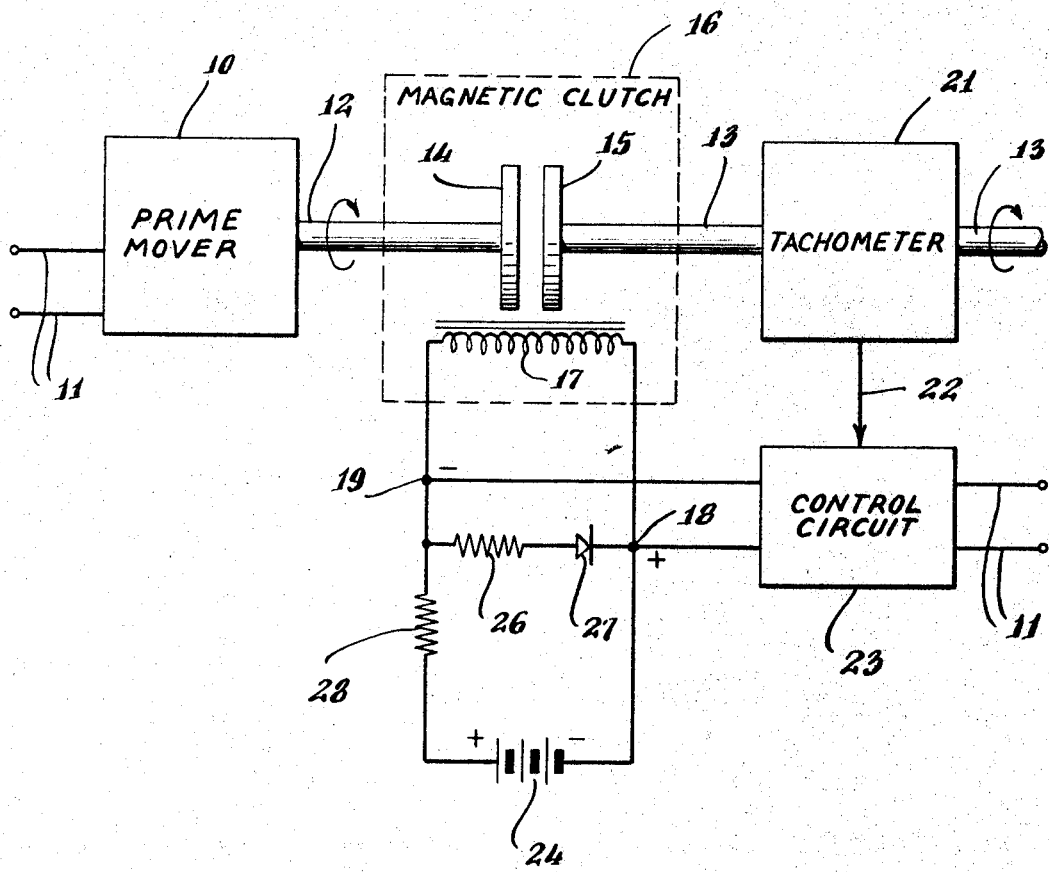
INVENTOR.
*John S. Patterson*
BY
*Stephen Roen*
ATTORNEY.

United States Patent Office
3,421,784
Patented Jan. 14, 1969

3,421,784
DEGAUSSING CIRCUIT FOR ELECTRO-MAGNETIC CLUTCH
John S. Paterson, Torrington, Conn., assignor to General Time Corporation, Stamford, Conn., a corporation of Delaware
Filed Dec. 28, 1966, Ser. No. 605,446
U.S. Cl. 192—84    7 Claims
Int. Cl. F16d 27/00; F16d 37/02; F16d 43/24

ABSTRACT OF THE DISCLOSURE

A system and circuit for a variable speed drive incorporating an intermittently-slipping magnetic clutch with a pulse-energized coil having a current-dissipating return bypass circuit, across which a reverse bias voltage source is connected to counteract the remanence or residual magnetism in the magnetic clutch, thus facilitating rapid correction of undesired speed variations.

RELATED APPLICATIONS

The magnetic clutch and variable speed drive incorporating the same disclosed herein is of the type disclosed and claimed in the U.S. patent application of Thomas W. Rogerson and Gerald A. Sweeney, Ser. No. 238,968 filed Nov. 20, 1962, now Patent No. 3,390,548. That application is assigned to the assignee of the present application and should be consulted for details of the magnetic clutch and variable speed drive system not important to an explanation of the present invention.

BACKGROUND OF THE INVENTION

This invention relates to magnetic clutches and to variable speed drives employing the same. More particularly, it relates to variable speed drive systems employing a prime mover such as an electric motor turning at a fixed rate and driving a power shaft coupled by an intermittently-slipping magnetic clutch to an output shaft which is to be driven at a preselected speed.

Magnetic clutches designed for repeated pulsing or intermittent slipping to connect a fixed speed prime mover to an output shaft to be driven at a selected driven speed have been utilized in various high-torque, heavy-duty applications with less than satisfactory speed regulation.

Sensitive devices have been employed to sense the driven speed of the output shaft, and these have been connected to suitable control systems connected to energize the magnetic clutch in response to reductions in output shaft speed and to de-energize the magnetic clutch as output shaft speed increases beyond a predetermined value. The hysteresis characteristics of the magnetic material employed in such clutches produce unavoidable remanence or residual magnetism, having the same effect as energization of the clutch solenoid winding coil. The remanence field produces a force tending to maintain the clutch in its engaged condition. To overcome this force, heavy springs have been required for disengaging and separating the clutch plates, with the consequent disadvantage of high mechanical inertia and consequent loss in speed control sensitivity of the system.

SUMMARY OF THE INVENTION

Accordingly, a principal object of the invention is to provide sensitively adjustable variable speed drive systems having highly sensitive speed-correcting capability.

Another object of the invention is to provide such variable speed drive systems employing magnetic clutches with means for counteracting residual magnetism therein.

A further object of the invention is to provide such variable speed drive systems incorporating means to dissipate energy stored in the magnetic clutch solenoid upon each interruption of the energizing current through a reverse bypass current path connected in parallel with the magnetic clutch winding.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

In general, the present invention comprises establishing a magnetic field in a magnetic clutch such as to produce a force tending to disengage the clutch opposite to the force tending to engage the clutch produced by the magnetic remanence field in the clutch. In a variable speed drive, because the clutch is initially fully energized in order to bring the output shaft up to the desired speed and because the magnetic circuit is energized in only one direction, the magnetic remanence field has a constant value. Thus, according to the invention, the magnetic remanence field may be counteracted by passing a direct current bias through the magnetic circuit in the opposite direction to that of the energizing current.

THE DRAWING

For a fuller understanding of the nature and objects of the invention, reference should be had to the following detailed description taken in connection with the accompanying drawing, in which the sole figure of the drawing is a schematic electrical circuit diagram partially in block form of a variable speed drive system having a magnetic clutch incorporating the highly sensitive speed correcting features of the invention.

SPECIFIC DESCRIPTION

In the system shown in the drawing, a prime mover power source 10 such as a large heavy duty electric motor is connected to a power line 11. It turns its driven shaft 12 at a standard predetermined rotational velocity exceeding the desired rotational velocity of an output shaft 13, which is rotatably supported in substantially coaxial alignment with the driven shaft 12.

Adjacent spaced ends of the shafts 12 and 13 are provided with engageable clutch plates 14 and 15 respectively, forming part of a magnetic clutch 16. The clutch plates 14 and 15 are adapted to be engaged and disengaged in response to the energization and de-energization of a clutch coil 17 through which a DC energizing current flows. As shown, the energizing current may be said to flow from + to − or from right to left from an input terminal 18 to an output terminal 19. The clutch is oil filled and adapted for controlled slippage, as more fully explained in the above-identified application.

A tachometer 21 is preferably connected to be driven by the output shaft 13. As disclosed in the above-identified copending application, the tachometer 21 is a small AC generator having 18 pairs of poles spaced about a ring-shaped rotor magnet mounted on shaft 13. It thus provides 18 cycles of alternating current for each revolution of the shaft 13. This alternating current is rectified to provide an "output velocity" signal supplied on feedback line 22 to control circuit 23, which is connected across the AC power line 11. The control circuit 23 compares this signal with a fixed-reference signal and produces a variable amplitude current control signal.

The output of control circuit 23 is connected to input terminal 18 and output terminal 19 of the magnetic clutch coil 17. In response to the difference between the output shaft velocity signal supplied by feedback line 22 and the reference signal, the control circuit 23 supplies a DC energizing current to terminals 18 and 19. This energizing current is inversely proportional to the direct current control signal and maintains the output shaft rotational velocity at its preselected value.

Thus a reduction in output shaft rotational velocity, reflected by a reduced feedback signal supplied by feedback line 22, produces an increase in current to terminals 18 and 19; increased engagement of clutch plates 14 and 15; and an increase in the rotational velocity of the output shaft 13 up to the desired value.

When it is desired to decrease the output shaft rotational velocity, the current supplied to coil 17 is decreased. If radical decrease in operating speed of shaft 13 is desired, this current may be discontinued as, for example, if it is desired to stop the machine connected to output shaft 13. However the residual magnetic field i.e., remanence in the soft magnetic material forming the clutch 16 causes a force which keeps clutch plates 14 and 15 engaged. Heretofore, relatively strong springs have been employed to separate clutch plates 14 and 15 in conditions of low or no current in coil 17. However, I have realized that in any operating cycle of the variable speed drive shown in the drawing, the coil 17 will have initially been energized with a maximum current signal from the control circuit 23. This will cause the soft magnetic material in the clutch 16 to saturate. Thus when the current in the coil 17 is discontinued, the magnetic field remanence in the clutch 16 will be constant. Therefore this field may be overcome by producing an equal and opposite field in the soft magnetic material of the clutch 16. I prefer to do this by supplying to coil 17 a fixed direct current bias in the opposite direction than the current supplied by control circuit 23. This reverse current produces a magnetic field at all times in the clutch 16 equal and opposite to the magnetic remanence induced therein by the current from the control circuit 23. Therefore when the current from the circuit 23 is discontinued, there will be no magnetic force between plates 14 and 15, and they may be separated by light springs or other convenient means.

More particularly, a DC "reverse bias" voltage source, such as a battery 24 or a full-wave rectified secondary winding of an AC transformer (not shown) provides across the terminals 18 and 19 a reverse bias to counteract residual magnetism in winding coil 17. The reverse bias has a polarity opposite to the energizing current supplied by control circuit 23. The reverse bias may be a steady or rectified and filtered DC current, or a pulsing DC current such as that supplied by a half-wave or full-wave rectified secondary winding of a transformer connected to the power line 11. In the illustrated embodiment of the invention, a 12 volt DC source connected across the output terminal 19 and the input terminal 18 provides a degaussing voltage causing a small degaussing current to flow through the magnetic clutch winding coil 17 in a direction opposite to that of the energizing current produced by the control circuit 23. For example, in a variable speed drive manufactured by applicant's assignee the degaussing current is about 15 milliamperes, as compared with the energizing current of 600 milliamperes provided by the control circuit 23.

The DC reverse bias or degaussing current supplied by the voltage source 24 is continuously supplied in the reverse direction across the terminals 19 and 18, as previously explained. Because of the saturation-level operation of the magnetic clutch 16, the degaussing current may have a constant fixed value, determined by selection of a series current limiting resistor 28.

When the energizing signal is not being supplied by control circuit 23, the small, constant degaussing current produced by the reverse bias voltage source 24 flows in the coil 17 in the opposite direction. This substantially overcomes the effect of the residual magnetism therein, and allows very light retracting spring means (not shown) to disengage the plates 14 and 15, minimizing the inertia and the mechanical response time of the plate disengaging-retracting mechanism. Consequently the sensitivity of the speed control mechanism is substantially increased over that available with conventional heavy-duty clutch plate disengaging retraction spring mechanisms. This is because the magnetic field created by the degaussing current substantially cancels the residual magnetism in coil 17. The resulting magnetic flux linkage through the clutch is very close to zero, within the limits of manufacturing tolerances, whenever the coil 17 is de-energized.

A parallel discharge circuit for dissipating energy stored in coil 17 upon de-energization is formed by a current limiting resistor 26 connected in series with diode 27 between the output terminal 19 and the input terminal 18 of the coil 17. Upon de-energization of coil 17, a transient peak discharge current is produced by the collapsing of the magnetic field in the magnetic clutch 16. This transient peak current flowing through coil 17 is harmlessly dissipated in the resistor 26, thus protecting the components of control circuit 23 from any such high peak transient discharge currents.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A magnetic clutch comprising:
   (A) a saturable electromagnet connected to a source of intermittent unidirectional energizing current; and,
   (B) a source of reverse-biasing potential connected to supply a direct current through the electromagnet
       (1) flowing in a direction opposite to and concurrent with that of the intermittent energizing current,
       (2) the reverse-biasing potential having a small value selected to counteract the residual magnetism of the electromagnet after its saturation and de-energization.

2. The magnetic clutch defined in claim 1 wherein the reverse-biasing potential has a fixed value.

3. In a variable speed drive system incorporating:
   (A) a prime mover connected to an output shaft by a magnetic clutch engaged by energization of a saturable coil therein;
   (B) a control circuit connected to compare the rotational velocity of the output shaft to a predetermined optimum velocity, and to supply a first source of direct energizing current having a characteristic varying in response to variations in said rotational velocity; and, the improvement comprising:
   (C) a source of continuous reverse-biasing potential connected to supply a direct current through said coil
       (1) flowing in a direction opposite to and concurrent with that of the first source of energizing current, and
       (2) having a small value selected to counteract the residual magnetism of the coil after its saturation and de-energization.

4. The variable speed drive system defined in claim 3, and:
   (D) a resistance and a unidirectional conductive device connected in series across said coil.

5. The variable speed drive system defined in claim 3 wherein said reverse-biasing potential has a fixed value.

6. In a variable speed drive having a unidirectionally energized electromagnetically engaged clutch, means for counteracting the force tending to engage said clutch caused by magnetic remanence in the clutch comprising:
  (A) means for establishing a magnetic field such as to produce a force tending to disengage said clutch, said magnetic field being opposite to and concurrent with the force tending to engage said clutch produced by magnetic remanence in the clutch.

7. The means defined in claim 6 wherein said force produced by said magnetic field means is equal to that produced by the magnetic remanence in the clutch after the magnetic material electromagnetically energized therein has been fully saturated.

References Cited

UNITED STATES PATENTS

| | | | |
|---|---|---|---|
| 799,720 | 9/1905 | Cutler | 192—18.2 X |
| 2,646,145 | 7/1953 | Durston | 192—18.2 |
| 3,204,148 | 8/1965 | Urbank | 310—94 |
| 3,351,791 | 11/1967 | Smith et al. | 310—94 |
| 3,223,212 | 12/1965 | Shepard | 192—18 |

JULIUS E. WEST, *Primary Examiner.*

ALLAN D. HERRMANN, *Assistant Examiner.*

U.S. Cl. X.R.

192—104; 310—95